United States Patent [19]

Bottoms et al.

[11] Patent Number: 4,979,184
[45] Date of Patent: Dec. 18, 1990

[54] AUTOMATIC EQUALIZER INITIALIZATION TIME CONTROL FOR MULTIPOINT NETWORKS

[75] Inventors: Stanley Bottoms, Seminole; William L. Betts, St. Petersburg; Kenneth Martinez, Pinellas Park, all of Fla.

[73] Assignee: A.T. & T. Paradyne, Largo, Fla.

[21] Appl. No.: 349,252

[22] Filed: May 9, 1989

[51] Int. Cl.⁵ .............................................. H04B 3/04
[52] U.S. Cl. ...................................... 375/13; 333/28 R
[58] Field of Search .................... 375/12, 13, 14, 15, 375/121, 109; 379/394, 414; 333/18, 28; 364/724.2

[56] References Cited

U.S. PATENT DOCUMENTS 4,672,630 6/1987 Kaku ........................................ 375/13

Primary Examiner—Benedict V. Safourek
Attorney, Agent, or Firm—Kane, Dalsimer, Sullivan, Kurucz, Levy, Eisele & Richard

[57] ABSTRACT

An apparatus monitors the convergence of the equalization training sequence in a multipoint communication network. Various latches record the period of the incoming sequence and the time to convergence, if any. A counter records the number of periods free of convergence, and upon the counter exceeding a threshold, the network train time is doubled. A register records the longest required time to convergence. This value is periodically compared to the network train time, and, if less, substituted therefor.

20 Claims, 1 Drawing Sheet

AUTOMATIC EQUALIZER INITIALIZATION TIME CONTROL FOR MULTIPOINT NETWORKS

BACKGROUND OF THE INVENTION

1. Field of the Invention

This invention relates to an apparatus and method for equalizer initialization time to be automatically adjusted for the remotes of a multipoint system.

2. Description of the Prior Art

The need to use equalizers in a multipoint communications network is well established. These equalizers must be initialized for the efficiency and efficacy of the communications network.

In the present state-of-the-art, the equalizer initialization training time is determined and manually set at the time of installation of the multipoint system. It is a common practice during installation to over-estimate the equalizer initialization training time in order to expedite installation.

However, the overestimation of equalizer initialization training time results in inefficiencies in a communication network. Similarly, if the communication environment improves such that a shorter initialization time and better network response time could be supported, this opportunity could be realized only by a manual adjustment of equalizer initialization time. Furthermore, during operation, if the environment worsens and the required initialization time changes so as to be greater than the manually set time, the performance of the system will be degraded.

Such manual adjustment is time-consuming and may be complicated by a large number of remotes and the use of different data transmission rates by different remotes within the system.

OBJECTS AND SUMMARY OF THE INVENTION

It is therefore the primary object of this invention to provide a method and apparatus to control the equalizer initialization time in each of the remotes in a multipoint communications network thereby providing the network with the optimum train time based on the current conditions.

It is a further object of this invention to provide a method and apparatus which controls the equalizer initialization time of a large number of remotes in a multipoint network, which may be operating at different transmission rates.

The invention includes a method and apparatus for the equalizer initialization time to be changed in the remotes of a multipoint network without operator intervention. The change in initialization time is based upon a continually monitored level of convergence of every equalization training sequence received at the master.

If the training sequence does not result in convergence a given number of times within a predetermined period for the given data transmission rate, the network train time is doubled. However, if within the same predetermined period, the longest train time required for convergence is less than the network train time, then the network train time is set equal (i.e., reduced to) the value of the longest train time required for convergence.

The use of a data rate detection apparatus allows this apparatus to be effective irrespective of how many remotes or different communication rates are employed in-bound.

DETAILED DESCRIPTION OF THE PREFERRED EMBODIMENT

Figure 1:
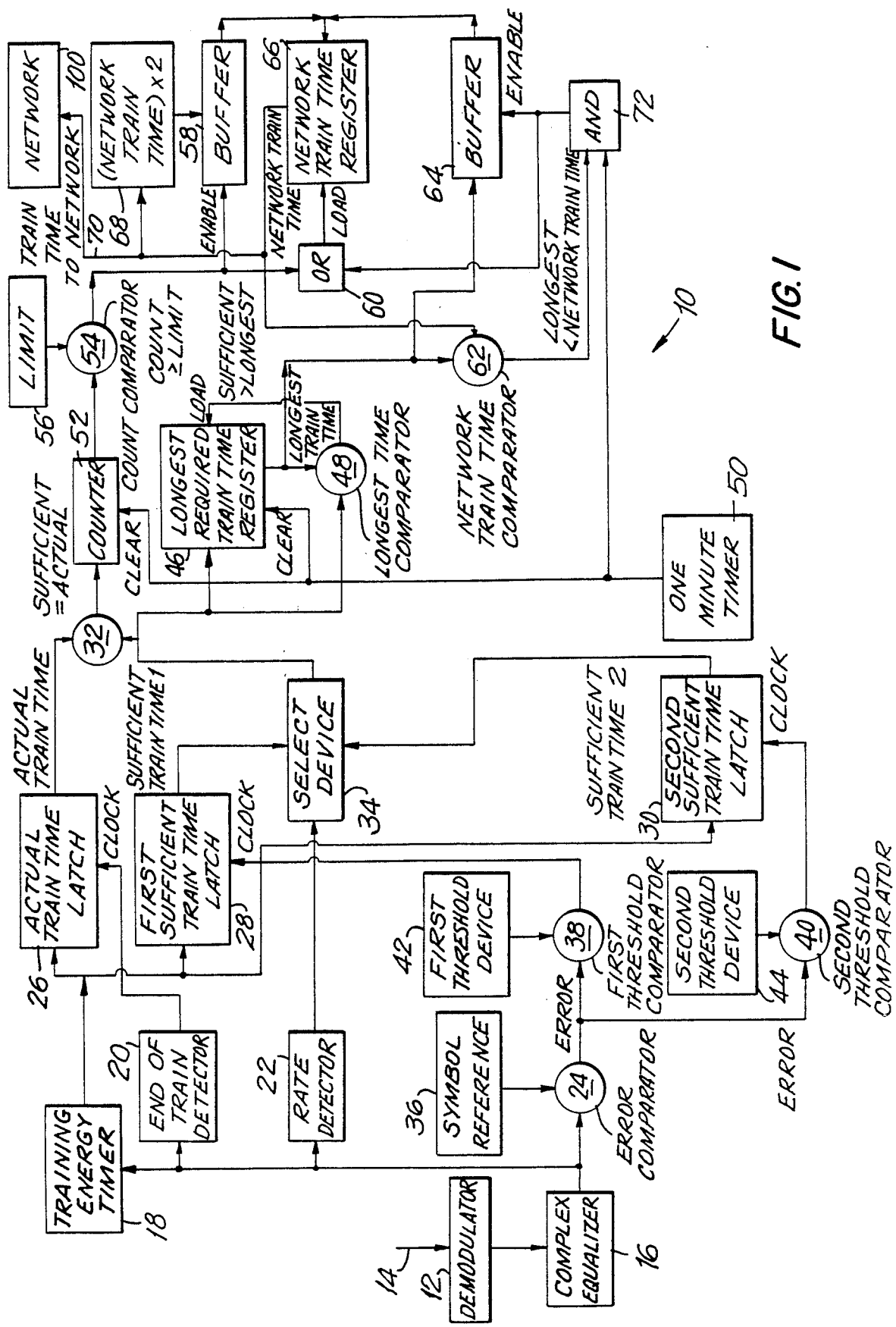
FIG. 1 discloses a block diagram of the present invention.

Turning now to FIG. 1 in detail, apparatus 1, which is in the master terminal of a multipoint system, includes a demodulator 12 which receives incoming messages from communications line 14, such as a telephone line, and outputs the demodulated signal to complex equalizer 16 as is well-known in the prior art.

The output of complex equalizer 16 is received by training energy timer 18, end-of-train detector 20, rate detector 22 and error comparator 24.

Training energy timer 18 includes timing apparatus which is activated by the initialization of signal energy received from equalizer 16. The total elapsed time from the initialization of signal energy is constantly output from training energy timer 18 to actual train time latch 26, first sufficient train time latch 28, and second sufficient train time latch 30.

The activation of the clock inputs of latches 26, 28 and 30 store the time from initial training energy to various relevant events as will be described herein.

First sufficient train time latch 28 corresponds to an arbitrary first data transmission rate while second sufficient train time latch corresponds to an arbitrary second data transmission rate. If more than two possible data rates are used in the network, more parallel sufficient train time latches would be added to apparatus 10.

End-of-train detector 20 detects an end-of-train symbol encoded in the training sequence of the incoming signal transmitted via complex equalizer 16. Upon detection of the end-of-train symbol, end-of-train detector 20 outputs a signal to the clock input of actual train time latch 26 so as to latch the current value of the training energy timer 18 to the output of actual train time latch 26. This output of actual train time latch 26 is equal to the most recent actual train time or time of the equalization training sequence and is the first input to train time comparator 32.

The training sequence of the incoming signal from communications line 14, transmitted via demodulator 12 and complex equalizer 16, includes information indicating the data transmission rate. This information may be encoded into an individual symbol or may be incorporated into the end-of-train symbol. This information or symbol is detected by rate detector 22. Rate detector 22, in response to the detection of this information, outputs a digital code representative of the detected rate to the first input of select device 34.

In the present example, only two possible data transmission rates are implemented, so the output from rate detector 22 to select device 34 may be implemented with a single bit of data. For more possible data rates, additional bits of information (preferably parallel bits so as to simplify the circuitry of select device 34) would be implemented.

Error comparator 24 receives its first input from complex equalizer 16, and its second input from symbol reference device 36. Symbol reference device 36 contains a table of the specific values of the expected training signals for a converged sequence as a function of time. By subtracting the expected signal from the actual signal, error comparator 24 generates an error signal which is input to first threshold comparator 38 and second threshold comparator 40. First and second threshold detectors 38 and 40 correspond to arbitrary first and second data transmission rates. The use of more than two data transmission rates requires a corresponding increase in the number of threshold comparators.

First and second threshold devices 42 and 44 are input into first and second threshold comparators, 38 and 40, respectively. First and second thresholds devices 42 and 44 store an error threshold for the first and second data transmission rates, respectively. As long as the error output from error comparator 24 is greater than the error threshold in first or second threshold device, 42 or 44, first or second threshold comparator, 38 or 40, respectively, outputs a signal to the clock input of first or second sufficient trail time latch, 28 or 30, respectively.

As soon as the error calculated by error comparator 24 is less than the threshold stored in threshold device 42 or 44, thereby indicating that the training sequence has converged, the output of comparator 38 or 40 goes to zero, and the sufficient train time latch 28 or 30 latches the value of training energy timer 18 when the training sequence converged. Therefore, the output of sufficient train time latch 28 or 30 is the time from the start of the training sequence to convergence.

Select device 34 receives the output of sufficient train time latches 28 and 30 (i.e., the convergence time), and selects the output of latch 28 or 30 depending upon which data transmission rate is indicated by rate detector 22. The selected sufficient train time latch output (i.e., the convergence time) is sent from select device 34 to the second input of train time comparator 32, the first input of longest required train time register 46 and longest time comparator 48.

Longest required train time register 46 stores a running update of the greatest sufficient or required train time within the most recent one minute period as defined by one minute timer 50. Timer 50 is attached to the clear line of register 46. When an updated sufficient train time is selected by select device 34 and output to longest time comparator 48, comparator 48 compares the contents of register 46 and the output of select device 34 and enables the load of register 46 so as to load the output of select device 34 into register 46 if the output of select device 34 is greater than the contents of register 46. The contents of register 46 are output to network train time comparator 62 and longest train time buffer 64.

As previously stated, train time comparator 32 receives an input from actual train time latch 26 and an input selected by select device 34 from sufficient train time latches 28 or 30.

In other words, train time comparator 32 compares the actual train time to the sufficient train time for the given data transmission rate. If the sufficient train time is not less than the actual train time, then it is determined that the training sequence did not converge in the time allotted, and a positive signal is output from train time comparator 32 to counter 52, thereby incrementing counter 52.

Counter 52 counts the number of times of lack of convergence within the most recent period of timer 50. One minute timer 50 clears the counter every minute. The output of counter 52 goes to count comparator 54. If the output of counter 52 is greater than or equal to a preset limit, such as five, in limit device 56, count comparator 54 sends a positive signal to OR-gate 60 and to the enable input of buffer 58.

Buffer 58 holds a value of twice the network train time register 66, as calculated by doubling block 68. When buffer 58 and OR-gate 60 enabled by comparator 54 (that is, when more than a present number of incidents of lack of convergence have occurred since that last one minute timer pulse), then OR-gate 60 enables the load of register 66 so that the contents of buffer 58 are loaded into network train time register 66 thereby doubling the network train time as is sent to network 100 via line 70 from register 66. Doubling block 68 may include an upper limit and signalling means to prevent excessive doubling and overflowing in the event of a malfunctioning non-converging system.

Network train time comparator 62 receives an input from the longest required train time register 46 and network train time register 66. Comparator 62 has a positive output to AND-gate 72 when the latter is greater than the former. That is, when the network train time is greater than the longest required train time, indicating that the network train time should be reduced, a positive signal is sent to AND-gate 72. If this positive signal is present when timer 50 sends a positive signal to AND-gate 72, the resulting positive output of AND-gate 72 firstly enables longest train time buffer 64 to load the value from longest required train time register 46 and secondly, effects a positive output from OR-gate 60 thereby enabling network train time register to load the value from longest train time buffer 64 thereby reducing the value of the network train time to the maximum convergence time which was required in the previous minute.

It should be recognized that all of the above storage components may include a table with an entry for each of the remotes in a multipoint system, and that the components would implicitly include indexing means so as to allow a single apparatus in the master to perform appropriate calculations for each of a number of remotes. Alternately, the apparatus 10 as described can adjust the train time of all remotes to be the longest required for any one of the remotes without the indexing means.

The functioning of apparatus 10 may by summarized to clarify how the above objects are effectively attained.

A training sequence is received from communications line 14, demodulated and equalized. Actual train time latch 26 records the time from the initial reception of energy to the end of the training sequence.

Latch 28 or 30 latches a time after the initial reception of energy to convergence of the training sequence.

Counter 52 keeps track of the number of times that no convergence occurred within the last minute, if this number exceeds a limit, such as five, the network train time is doubled thereby allowing for a longer training sequence and decreasing any degradation in communication quanity.

However, if the longest required train time, as held in register 46 is shorter than the network train time at the end of the minute period, then the lonqest required train time is substituted into the network train time register, thereby reducing the network train time and increasing network efficiency.

Obviously, many modifications and variations of the invention are possible in light of the above description. It is therefore to be understood that within the scope of the appended claims, the invention may be practiced other than as specifically described.

What is claimed is:

1. An apparatus for automatically adjusting a period of an equalization training sequence in a communications network comprising:
   first means for indicating a period of an equalization training sequence;
   second means for indicating convergence of a difference between the equalization training sequence and an expected equalization training sequence to within a threshold value;
   determining means responsive to said first and second indicating means for determining if convergence of said difference to within said threshold value occurred within the period of the equalization training sequence; and
   increasing means responsive to said determining means for automatically increasing the period of subsequent initialization training sequences in the event of a number of equalization training sequence free of convergence occurring within an interval.

2. The apparatus of claim 1 further including:
   storage means responsive to said determining means for storing a longest period required for convergence; said longest period being within the period of the equalization training sequence;
   decreasing means responsive to said storage means for automatically decreasing the period of subsequent initialization training sequences in the event that the longest period stored in said storage means is shorter than the period of equalization training sequences.

3. The apparatus of claim 2 wherein said first indicating means includes a timing means responsive to initialization training sequences.

4. The apparatus of claim 3 wherein said first indicating means includes a first latching means and end-of-train detecting means, wherein an input of said first latching means is an output of said timing means and wherein an output of said end-of-train detecting means is a clock input of said first latching means.

5. The apparatus of claim 3 wherein said second indicating means includes:
   reference means including values of said expected initialization training sequence;
   first calculating means for calculating said difference between said initialization training sequence and said expected equalization training sequence; and
   second calculating means for comparing the difference to said threshold value, wherein said threshold value is pre-selected.

6. The apparatus of claim 4 wherein said determining means includes at least one train time latching means with an input from said timing means and a clock input from said second indicating means.

7. The apparatus of claim 6 further including a transmission rate detecting means; wherein one train time latching means is provided for each data transmission rate of the network; and wherein an output of the train time latching means is selected in response to said transmission rate detecting means.

8. The apparatus of claim 6 wherein said determining means includes a comparing means for comparing an output of said first latching means to an output of said train time latching means.

9. The apparatus of claim 8 wherein said comparing means indicates a lack of a convergence of said difference if the output of said first latching means is at least as great as the output of said train time latching means.

10. The apparatus of claim 9 wherein said determining means includes a counter responsive to said comparing means.

11. The apparatus of claim 10 wherein said counter is periodically reset.

12. The apparatus of claim 11 wherein said increasing means includes a second comparing means which, upon finding that said counter outputs a value greater than a limit, outputs a signal to increase the period of the initialization training sequence.

13. The apparatus of claim 12 wherein said increasing means further includes:
   a network train time register which stores the desired period for the initialization training sequence;
   a buffer;
   a block for increasing the desired period for the initialization training sequence;
   wherein an input of said network train time register and a load enable input of said buffer are responsive to said second comparing means; and
   wherein said network train time register, said block for increasing the desired period and said buffer are arranged in a closed-loop configuration.

14. The apparatus of claim 6 wherein said storage means further includes:
   a longest required time register;
   a longest time comparator;
   wherein an output selected from said at least one train time latching means is an input to said longest required train time register and to a first input of said longest time comparator;
   wherein an output of said register is a second input to said longest time comparator:
   wherein said comparator load enables said register when said first input is greater than said second input.

15. The apparatus of claim 14 wherein said longest required train time register is periodically cleared.

16. The apparatus of claim 14 wherein said storage means further includes a network train time comparator for comparing an output of a network train time register to an output of said longest required train time register.

17. The apparatus of claim 16 wherein said decreasing means, responsive to said network train time comparator, places the contents of the longest required train time register into the network train time register when the former is less than the latter.

18. The apparatus of claim 17 wherein said decreasing means includes buffer with an input from said longest required train time register; an enable line of said buffer being responsive to said network train time comparator; and an output of said buffer leading to an input of said network train time register.

19. A method for automatically adjusting a period of an equalization training sequence in a communications network, comprising the steps of:
   indicating a period of an equalization training sequence;
   indicating convergence of a difference between he equalization training sequence and an expected equalization training sequence to within a threshold value;
   determining if convergence of said difference to within said threshold value occurred within the period of the equalization training sequence;

automatically increasing the period of subsequent initialization training sequences in the event of a number of equalization training sequences free of convergence occurring within an interval;

storing a longest period for convergence within the period of the equalization training sequence; and automatically decreasing the period of subsequent initialization training sequences in the event that the longest period stored in said storing step is shorter than the period of equalization training sequences.

20. An apparatus for automatically adjusting a period of an equalization training sequence in a communications network comprising:

first means for indicating a period of an equalization training sequence, including timing means responsive to initialization training sequences;

second means for indicating convergence of a difference between the equalization training sequence and an expected equalization training sequence to within a threshold value;

determining means responsive to said first and second indicating means for determining if convergence of said difference to within said threshold value occurred within the period of the equalization training sequence, including;

at least one train time latching means with an input from said timing means and a clock input from said second indicating means;

a comparing means for comparing an output of said timing means to an output of said train time latching means and indicating a lack of convergence if the output of said latching means is at least as great as the output of said train time latching means;

a counter responsive to said comparing means, said counter being periodically reset; and increasing means responsive to said determining means for automatically increasing the period of subsequent initialization training sequences in the event of a number of equalization training sequences free of convergence occurring within an interval;

storage means responsive to said determining means for storing a longest period required for convergence; said longest period being within the period of the equalization training sequence, said storage means including;

a longest required time register;

a longest time comparator;

wherein an output selected from said at least one train time latching means is an input to said longest required train time register and to a first input of said longest time comparators;

wherein an output of said register is a second input to said longest time comparator:

wherein said comparator load enables said register when said first input is greater than said second input; and decreasing means responsive to said storage means for automatically decreasing the period of subsequent initialization training sequences in the event that the longest period stored in said storage means is shorter than the period of equalization training sequences.

* * * * *